United States Patent Office.

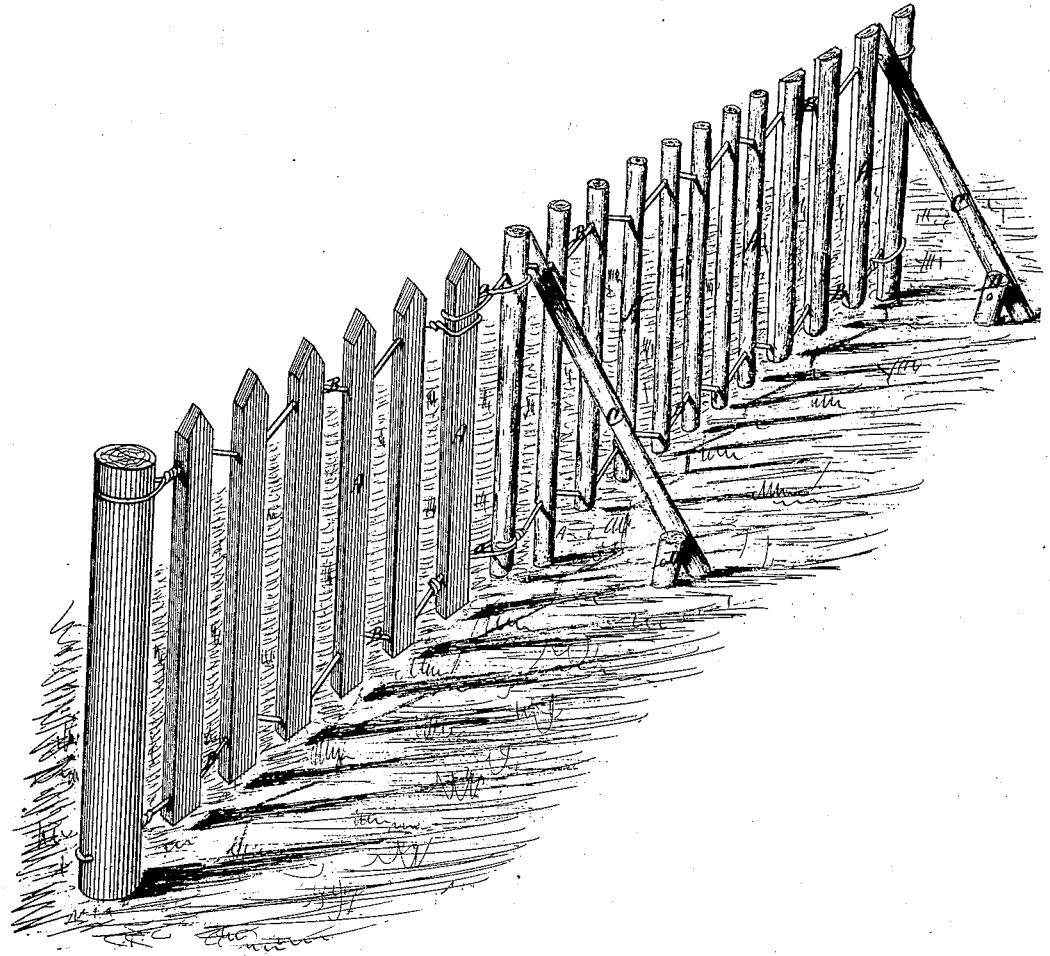

EDWARD FALES, OF GLENWOOD, MISSOURI.

Letters Patent No. 107,020, dated September 6, 1870.

IMPROVEMENT IN FENCE.

The Schedule referred to in these Letters Patent and making part of the same.

*To all whom it may concern:*

Be it known that I, EDWARD FALES, of Glenwood, in the county of Schuyler and in the State of Missouri, have invented certain new and useful Improvements in Fences; and do hereby declare that the following is a full, clear, and exact description thereof, reference being had to the accompanying drawing and to the letters of reference marked thereon making a part of this specification.

The nature of my invention consists in the construction and arrangement of a fence, as will be hereinafter fully set forth.

In order to enable others skilled in the art to which my invention appertains to make and use the same, I will now proceed to describe its construction and operation, referring to the annexed drawing, which represents a perspective view of my fence.

A A represent the pickets of my fence, connected by means of wires B B passing through holes in the same, one near each end. The holes in every alternate picket are closer together than in the others, thereby making the wires B B run in zigzag form, and preventing the pickets from coming together or moving on the wires.

The fence is supported by braces C C, having holes through their upper ends, through which the upper wire B passes, the lower ends of said braces being secured to stakes D D driven into the ground.

The picket on one side of each brace C is longer than the rest, and inserted in the ground.

The panels of the fence are connected by means of loops *a a* formed on the ends of the wires B B, as shown, one loop being formed on the upper wire in one panel, and on the lower wire in the other panel.

Instead of having the wires B B run in the zigzag form above described, the holes through the pickets may be made slanting, so that the wires will run down from one picket to the other and up through the pickets, forming, as it were, bends in the wires upon which the pickets are placed.

Having thus fully described my invention,

What I claim as new, and desire to secure by Letters Patent, is—

The combination of the pickets A A, wires B B, with loops *a a*, braces C C, and stakes D D, all constructed and arranged substantially as and for the purposes herein set forth.

In testimony that I claim the foregoing, I have hereunto set my hand this 25th day of April, 1870.

EDWARD FALES.

Witnesses:
W. H. STEELE,
J. H. FINNELL.